(12) United States Patent
Dendy et al.

(10) Patent No.: US 10,426,198 B2
(45) Date of Patent: Oct. 1, 2019

(54) ELECTRICAL CONNECTOR FOR AN ELECTRONIC VAPING DEVICE

(71) Applicant: Altria Client Services LLC, Richmond, VA (US)

(72) Inventors: Charles Dendy, Richmond, VA (US); Geoffrey Brandon Jordan, Midlothian, VA (US); Barry S. Smith, Hopewell, VA (US)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 379 days.

(21) Appl. No.: 15/339,018

(22) Filed: Oct. 31, 2016

(65) Prior Publication Data

US 2018/0116282 A1 May 3, 2018

(51) Int. Cl.
| H05B 3/40 | (2006.01) |
| H05B 3/42 | (2006.01) |
| A24F 47/00 | (2006.01) |
| H05B 3/03 | (2006.01) |
| F16B 7/20 | (2006.01) |
| F16B 21/04 | (2006.01) |
| F16B 1/00 | (2006.01) |

(52) U.S. Cl.
CPC ............ *A24F 47/008* (2013.01); *H05B 3/03* (2013.01); *F16B 7/20* (2013.01); *F16B 21/04* (2013.01); *F16B 2001/0064* (2013.01)

(58) Field of Classification Search
CPC .. H05B 3/20–22; H05B 3/40–42; H05B 3/34; A24F 47/00–008; A61M 11/041–042
USPC ....... 392/390, 391, 394, 395–398, 407, 409, 392/410, 441, 465, 476–477
See application file for complete search history.

(56) References Cited

U.S. PATENT DOCUMENTS

| 5,309,336 A | 5/1994 | Hartt et al. |
| 6,403,935 B2 | 6/2002 | Kochman et al. |
| 7,513,795 B1 | 4/2009 | Shaw |
| 2012/0261489 A1 | 10/2012 | Hsu |
| 2013/0152954 A1 | 6/2013 | Youn |

(Continued)

FOREIGN PATENT DOCUMENTS

| CN | 202525085 U | 11/2012 |
| CN | 203087526 U | 7/2013 |

(Continued)

OTHER PUBLICATIONS

International Search Report and Written Opinion for corresponding PCT Application No. PCT/EP2017/077915 dated Apr. 20, 2018.

(Continued)

*Primary Examiner* — Michael A Laflame, Jr.
(74) *Attorney, Agent, or Firm* — Harness, Dickey & Pierce, P.L.C.

(57) ABSTRACT

At least one example embodiment relates to an e-vaping device. Some example embodiments include a vaporizer assembly, a power supply for supplying power to the vaporizer assembly, a male connector connected to the vaporizer assembly or the power supply and a female connector connected to the vaporizer assembly or the power supply. The male connector may include a first male electrode and a second male electrode encompassed by the first male electrode. The female connector may include a first female electrode and a second female electrode encompassed by the first female electrode.

20 Claims, 12 Drawing Sheets

(56) References Cited

U.S. PATENT DOCUMENTS

| | | |
|---|---|---|
| 2013/0192615 A1 | 8/2013 | Tucker et al. |
| 2013/0192616 A1 | 8/2013 | Tucker et al. |
| 2013/0192619 A1 | 8/2013 | Tucker et al. |
| 2013/0192620 A1 | 8/2013 | Tucker et al. |
| 2013/0192621 A1 | 8/2013 | Li et al. |
| 2013/0192622 A1 | 8/2013 | Tucker et al. |
| 2013/0192623 A1 | 8/2013 | Tucker et al. |
| 2013/0213418 A1 | 8/2013 | Tucker et al. |
| 2013/0220315 A1 | 8/2013 | Conley et al. |
| 2013/0319407 A1 | 12/2013 | Liu |
| 2014/0034071 A1 | 2/2014 | Levitz et al. |
| 2014/0041655 A1 | 2/2014 | Barron et al. |
| 2014/0144453 A1 | 5/2014 | Capuano et al. |
| 2014/0150783 A1 | 6/2014 | Liu |
| 2014/0182611 A1 | 7/2014 | Liu |
| 2014/0190502 A1 | 7/2014 | Liu |
| 2014/0261489 A1 | 9/2014 | Cadieux et al. |
| 2014/0261493 A1 | 9/2014 | Smith et al. |
| 2015/0020823 A1 | 1/2015 | Lipowicz et al. |
| 2015/0196718 A1 | 7/2015 | Radmer et al. |
| 2015/0272221 A1 | 10/2015 | Liu |
| 2015/0296889 A1 | 10/2015 | Liu |
| 2015/0313275 A1 | 11/2015 | Anderson et al. |
| 2016/0242468 A1 | 8/2016 | Liu |

FOREIGN PATENT DOCUMENTS

| | | |
|---|---|---|
| WO | WO-2012/142293 A2 | 10/2012 |
| WO | WO-2013/171206 A1 | 11/2013 |

OTHER PUBLICATIONS

Partial International Search Report and Written Opinion for corresponding European Application No. PCT/EP2017/077915 dated Feb. 2, 2018.

International Preliminary Report on Patentability dated Feb. 4, 2019 issued in corresponding International Application No. PCT/EP2017/077915.

ELECTRICAL CONNECTOR FOR AN ELECTRONIC VAPING DEVICE

BACKGROUND

Field

One or more example embodiments relate to electrical connectors for electronic vaping devices.

Description of Related Art

An electronic vaping (e-vaping) device includes a heater element, which vaporizes a pre-vapor formulation to produce a vapor or dispersion to be drawn through outlets of the e-vaping device. Electronic vapor devices may be referred to as e-vapor devices or e-vaping devices.

The e-vaping device includes a power supply, such as a battery, arranged in the e-vaping device. The battery is electrically connected to the heater, such that the heater heats to a temperature sufficient to convert the pre-vapor formulation to a vapor. The vapor exits the e-vaping device through a mouth-end piece including at least one outlet.

SUMMARY

This section provides a general summary of the disclosure, and is not a comprehensive disclosure of its full scope or all of its features.

At least one example embodiment relates to an e-vaping device.

Some example embodiments include a vaporizer assembly, a power supply configured to supply power to the vaporizer assembly, a male connector connected to the vaporizer assembly or the power supply and a female connector connected to the vaporizer assembly or the power supply.

Example embodiments of the male connector include a first male electrode defining an internal cylindrical surface, a second male electrode encompassed by the first ale electrode, and at least one flange at a proximate end region of the male connector. At least a portion of the flange is a substantially planar secant surface.

Example embodiments of the female connector include a first female electrode defining a recess and a second female electrode encompassed by the first female electrode. At least one secant flange is connected to the first female electrode in the recess. And at least one flange receiving channel is in an exterior surface of the female electrode.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 5A illustrates a cross-sectional view of a vaporizer assembly according to the first example embodiment shown in. FIG. 1A;

Corresponding reference numerals indicate corresponding parts throughout the several views of the drawings.

DETAILED DESCRIPTION

Figure 1A:
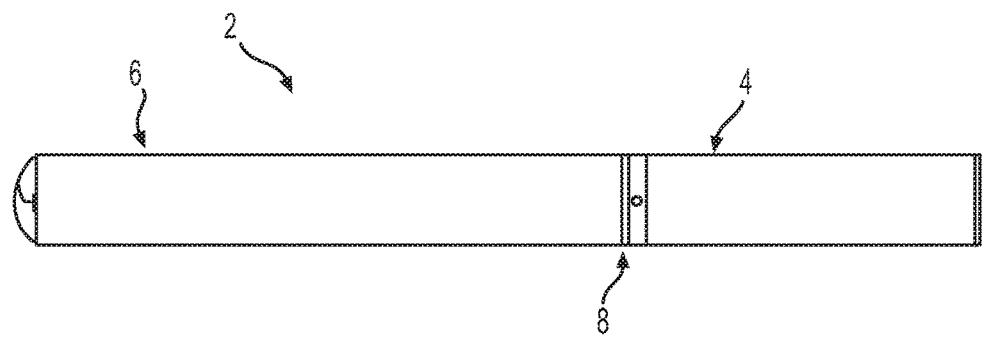
FIG. 1A illustrates a first example embodiment of an electronic vaping device.

Example embodiments will now be described more fully with reference to the accompanying drawings.

Example embodiments are provided so that this disclosure will be thorough, and will fully convey the scope to those who are skilled in the art. Numerous specific details are set forth such as examples of specific items, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or items, but do not preclude the presence or addition of one or more other features, integers, steps, operations, elements, items, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, items, regions, layers and/or sections, these elements, items, regions, layers and/or sections should not be limited by these terms. These terms may be only used to distinguish one element, item, region, layer or section from another region, layer or section. Terms such as "first," "second," and other numerical terms when used herein do not imply a sequence or order unless clearly indicated by the context. Thus, a first element, item, region, layer or section discussed below could be termed a second element, item, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A pre-vapor formulation is a material or combination of materials that may be transformed into a vapor. For example, the pre-vapor formulation may be a liquid, solid, and/or gel formulation including, but not limited to: water, beads, solvents, active ingredients, ethanol, plant extracts, natural or artificial flavors, and/or vapor formers such as glycerin and propylene glycol. U.S. patent application Ser. No. 14/602,099 (Publication No. 2015/0313275), U.S. patent application Ser. No. 14/333,212 (Publication No. 2015/0020823) and U.S. patent application Ser. No. 13/756,127 (Publication No. 2013/0192623), which are incorporated herein by reference in their entirety, disclose examples of formulation mixtures.

The pre-vapor formulation may include nicotine or may exclude nicotine. The pre-vapor formulation may include one or more tobacco flavors. The pre-vapor formulation may include one or more flavors that are separate from one or more tobacco flavors.

In some example embodiments, a pre-vapor formulation that includes nicotine may also include one or more acids. The one or more acids may be one or more of pyruvic acid, formic acid, oxalic acid, glycolic acid, acetic acid, isovaleric acid, valeric acid, propionic acid, octanoic acid, lactic acid, levulinic acid, sorbic acid, malic acid, tartaric acid, succinic acid, citric acid, benzoic acid, oleic acid, aconitic acid, butyric acid, cinnamic acid, decanoic acid, 3,7-dimethyl-6-octenoic acid, 1-glutamic acid, heptanoic acid, hexanoic acid, 3-hexenoic acid, trans-2-hexenoic acid, isobutyric acid, lauric acid, 2-methylbutyric acid, 2-methylvaleric acid, myristic acid, nonanoic acid, palmitic acid, 4-penenoic acid, phenylacetic acid, 3-phenylpropionic acid, hydrochloric acid, phosphoric acid, sulfuric acid and combinations thereof.

Figure 1B:
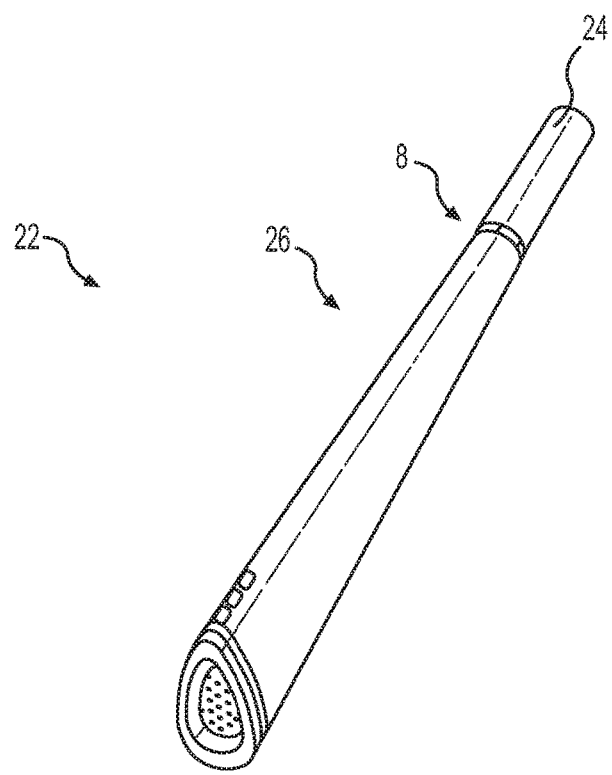
FIG. 1B illustrates a further example embodiment of an electronic vaping device.

FIGS. 1A and 1B illustrate respective example embodiments of e-vaping devices 2 and 22.

As shown in FIG. 1A, an example embodiment of the e-vaping device 2 may include a vaporizer assembly 4, a battery assembly 6, and a connector 8 that joins the vaporizer assembly 4 to the battery assembly 6. A further example embodiment 22 is shown in FIG. 1B and may include a vaporizer assembly 24, a battery assembly 26, and the connector 8 that joins the vaporizer assembly 24 to the battery assembly 26. The vaporizer assemblies 4 and 24 include structural features that heat a pre-vapor formulation to generate a vapor or dispersion. Such structural features are described in detail below.

The battery assemblies 6 and 26 provide power to the vaporizer assemblies 4 and 24, respectively. The battery assemblies 6 and 26 of the electronic vaping devices 2 and 22, respectively, may each be a reusable fixture. And the vaporizer assemblies 4 and 24 of the electronic vaping device 2 and 22, respectively, may each be a replaceable fixture. The vaporizer assemblies 4 or 24 are similarly constructed. Therefore, unless otherwise specifically referring to a specific example embodiment, vaporizer assembly 4 hereinafter will be referred to as the example vaporizer assembly; however, a person having ordinary skill in the art will understand that any of various vaporizer assemblies are applicable.

Figure 2:
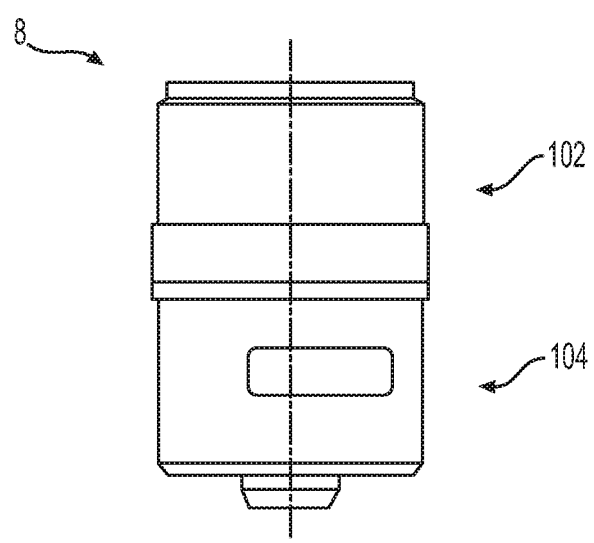
FIG. 2 illustrates an example embodiment of a connector for the electronic vaping devices shown in FIGS. 1A and 1B.

As shown in FIG. 2, the connector 8, which is discussed in more detail below, may include a male connecting portion, e.g., a male connector 102, and a female connecting portion, e.g., a female connector 104. The male connector 102 may be secured to one of the vaporizer assembly 4 and the battery assembly 6 or 26. The female connector 104 is secured to the other of the vaporizer assembly 4 or 24 and the battery assembly 6 or 26. For example, when the male connector 102 is secured to the vaporizer assembly 4 or 24, the female connector 104 is secured to the battery assembly 6 or 26 (and vice versa). The connectors 102 and 104 are secured to the assemblies via an adhesive, a press fit, an interference fit or any other securing application that fixes the connector portions in the vaporizer and battery assemblies. The female connector 104 longitudinally and rotationally receives the male connector 102 to electrically couple the vaporizer assembly 4 or 24 and the battery assembly 6 or 26. The male connector 102 and the female connector 104 are discussed in more detail below.

Figure 3A:
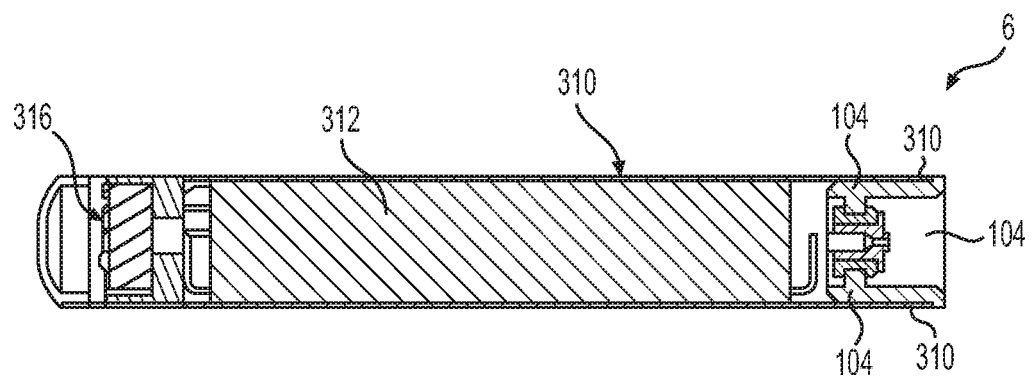
FIG. 3A illustrates a cross-sectional view of a battery assembly according to the first example embodiment shown in FIG. 1A.
Figure 3B:
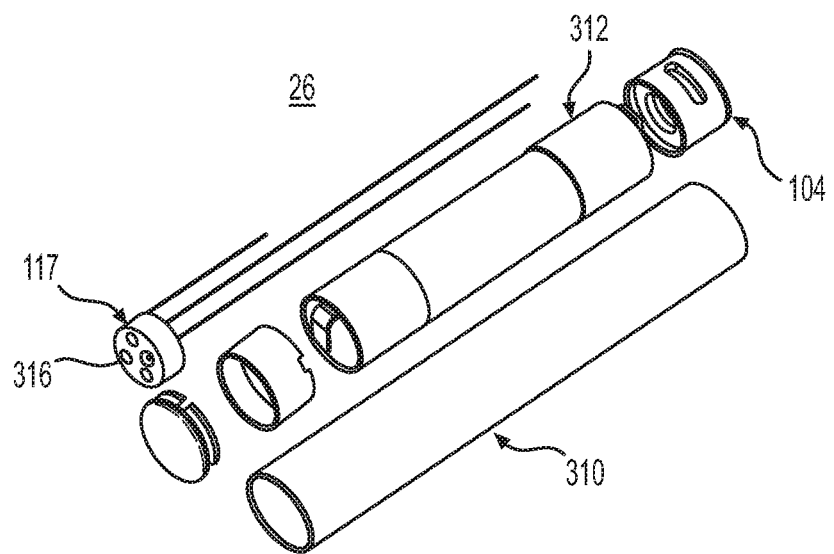
FIG. 3B illustrates an exploded perspective view of the battery assembly of FIG. 3A.
Figure 4A:
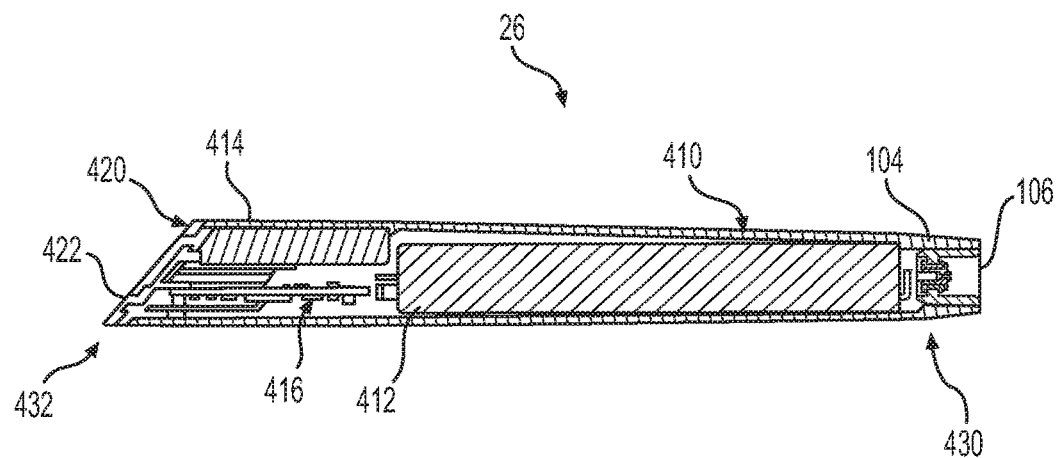
FIG. 4A illustrates a cross-sectional view of a battery assembly according to the further example embodiment shown in FIG. 1B.
Figure 4B:
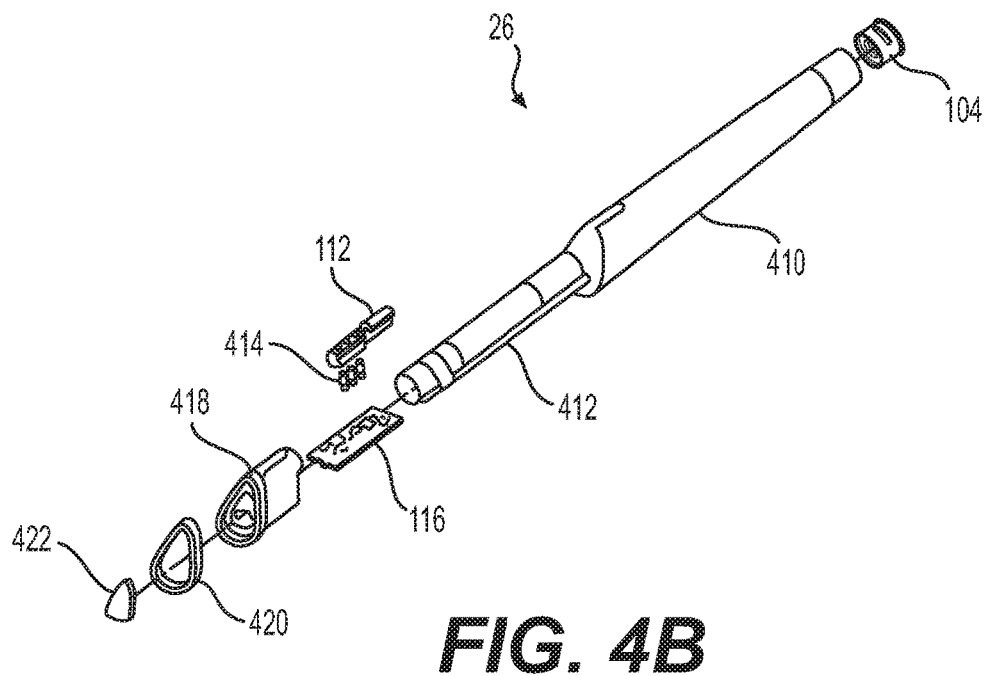
FIG. 4B illustrates an exploded perspective view of the battery assembly of FIG. 4A.

FIGS. 3A, 3B, 4A and 4B are views of respective example embodiments of the battery assemblies 6 and 26 of the e-vaping devices 2 and 22 shown in FIGS. 1A and 1B with which the connector 8 can be employed. FIGS. 3A and 3B are cross-sectional and exploded views, respectively, of the example embodiment of the battery assembly 6. FIGS. 4A and 4B are cross-sectional and exploded views, respectively, of the example embodiment of the battery assembly 26.

With reference to FIGS. 1A, 3A and 3B, the battery assembly 6 includes a housing shell 310 that contains, inter alia, a battery 312 and control circuitry 316 therein. referring to FIGS. 1B, 4A and 4B, the battery assembly 26 includes a housing shell 410 that contains, inter alia, a battery 412 and control circuitry 416 therein. Each of the control circuitries 316 and 416 may be a processor, a microprocessor, a controller, an application specific integrated circuit (ASIC), or other such hardware.

With reference to FIGS. 3A and 3B, the control circuitry 316 may connect to a puff sensor (not shown), which is operable to sense an air pressure drop within the e-vaping device and initiate application of voltage from the battery assembly 6 to a heater in the vaporizer assembly 4. The control circuitry 316 may control the supply of power to the heater in response to the puff sensor detecting a pressure drop. Further, with respect to FIGS. 4A and 4B, the control circuitry 416 may connect to a puff sensor (not shown), which is operable to sense an air pressure drop within the e-vaping device and initiate application of voltage from the battery assembly 26 to a heater in the vaporizer assembly 24. The control circuitry 416 may control the supply of power to the heater in response to the puff sensor detecting a pressure drop.

With further reference to FIGS. 4A and 4B, in the example embodiment of the electronic vaping device 22, an end 430 of the battery assembly 26 has (adjacent to the female connector 104) a cylindrical shape, which transitions into a triangular form at an opposing end 432 (adjacent to a second electrical contact 422). For instance, the opposing end 432 may have a cross-sectional shape that resembles a Reuleaux triangle. A Reuleaux triangle is a shape formed from the intersection of three circles, each having its center on the boundary of the other two. The battery assembly 26 may also have a slanted end face (relative to the longitudinal axis of the battery assembly 26). However, it should be understood that example embodiments may have other configurations and are not limited to the above forms.

The battery assembly 26 may increase in size from the end 430 (adjacent to the female connector 104) to the opposing end 432 (adjacent to a second contact 422). The diameter of the end 430 and the overall length of the battery assembly 26 may be about 9.50 mm and 100.9 mm, respectively, although example embodiments are not limited thereto.

The housing shells 310 and 410 may be formed of plastic and may optionally include a metal (e.g., aluminum) coating, although other suitable materials may be used. In some example embodiments, as shown in FIGS. 4A and 4B for example, the female connector 104 is disposed at the end 430 of the housing shell 410, while an end cap 418, a first contact 420 (e.g., positive contact), and the second contact 422 (e.g., common contact) are disposed at the opposing end 432 of the housing shell 410.

A light article 414 (e.g., light pipe) may be disposed in the end 432 of the battery assembly 26. The light article 414 may be configured to emit a light that is visible to an adult vaper based on the state of the e-vaping device. In an example embodiment, the light article 414 may emit a light of a first color during vaping, a light of a second color when the battery 412 is running low, and/or a light of a third color when the battery 412 is being charged. In lieu of (or in addition to) colored lights, the light article 414 may emit a flashing light and/or a pattern of lights as a status indicator.

With yet further reference to FIGS. 4A and 4B, the end cap 418 may be formed of a translucent material or otherwise configured such that the light emitted by the light article 414 will be visible. The first contact 420 and the second contact 422 may be formed of stainless steel with a nickel-silver coating, although example embodiments are not limited thereto.

The battery assemblies 6 and 26 are not limited to the battery 312 and 412; they may be any other power supply. The power supply may be a Lithium-ion battery or one of its variants, for example, a Lithium-ion polymer battery. Alternatively, the power supply may be a nickel-metal hydride battery, a nickel cadmium battery, a lithium-manganese battery, a lithium-cobalt battery or a fuel cell. The e-vaping device may be operable by an adult vaper until the energy in the power supply is depleted or in the case of lithium polymer battery, a minimum voltage cut-off level is achieved.

In at least one example embodiment, the power supply may be rechargeable and may include circuitry configured to allow the power supply to be charged by an external charging device (not shown). To recharge the e-vaping device, a Universal Serial Bus (USB) charger or other suitable charger assembly may be used.

Figure 5A:
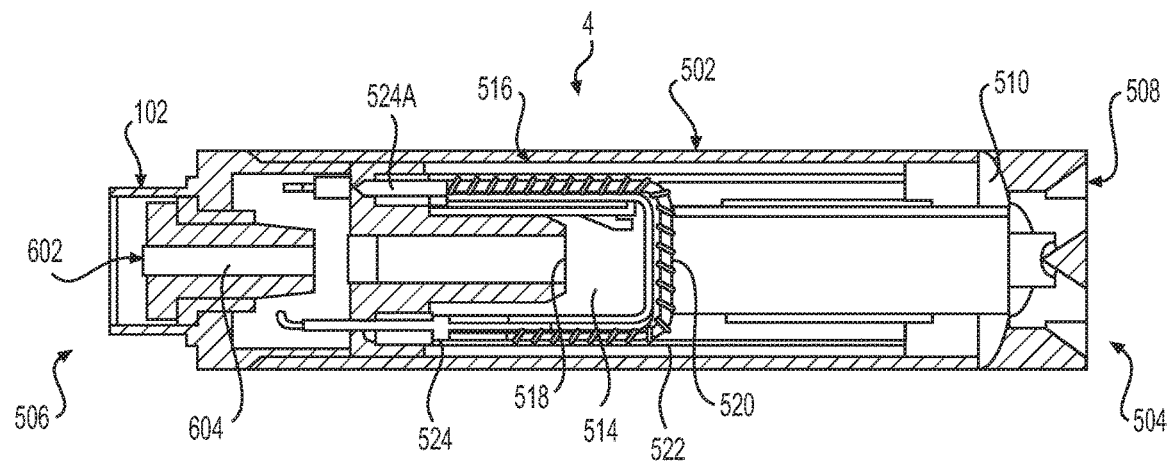
Figure 5B:
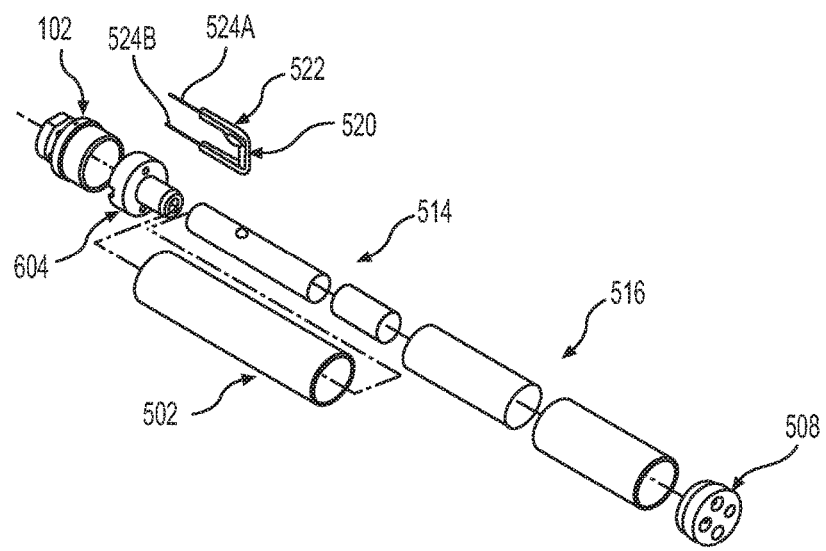
FIG. 5B illustrates an exploded perspective view of the battery assembly of FIG. 5A.

FIG. 5A is a cross-sectional view and FIG. 5B is an exploded view of example embodiments of the vaporizer assembly 4 of the e-vaping device 2. As with the battery assembly, different vaporizer assemblies can be employed with the present connector 8. For discussion purposes, this disclosure will refer only to the vaporizer assembly 4. However, a person having ordinary skill in the art will understand that any of various vaporizer assemblies is applicable.

Referring to FIG. 5A, the vaporizer assembly 4 includes a housing 502 with an end region 504 and an opposing end region 506. The housing 502 may be formed of metal (e.g., stainless steel), although other suitable materials may be used. A mouth-end portion 508, (e.g., an end-cap, an end region, a mouthpiece, etc.) and a sealing ring 510 are disposed at the end region 504 of the housing 502, while the male connector 102 (e.g., vaporizer connector) of the connector 8 is disposed at the opposing end region 506 of the housing 502.

The housing 502 may be formed of metal (e.g., stainless steel), although other suitable materials may be used.

The vaporizer assembly 4 heats a pre-vapor formulation contained within the vaporizer assembly 4 to generate a vapor capable of being drawn through a multi-port insert 512 in the mouth-end portion 508. U.S. patent application Ser. No. 13/741,254 (Publication No. 2013/0192619), which is incorporated herein by reference in its entirety discloses an example dispersion multi-port mouth insert. The battery assembly 6 provides power to the vaporizer assembly 4. In this regard and as discussed in more detail below with respect to FIGS. 10-13, the male connector 102 engages with the female connector 104 so as to electrically couple the vaporizer assembly 4 to the battery assembly 6.

The vaporizer assembly 4 includes an inner tithe 514, a pre-vapor formulation reservoir 516 for storing or containing a pre-vapor formulation, and a vaporizer assembly inlet 518. The inner tube 514 defines a passage that is generally coaxially positioned in and with the housing 502. The pre-vapor formulation reservoir 516 may be contained in an outer annulus between the housing 502 and the inner tube 514.

The pre-vapor formulation reservoir 516 may include a winding of cotton gauze or other fibrous material about a portion of the vaporizer assembly 4. The pre-vapor formulation reservoir 516 may be a fibrous material further including at least one of cotton, polyethylene, polyester, rayon and combinations thereof. The fibers may have a diameter ranging in size from about 6 microns to about 15 microns (e.g., about 8 microns to about 12 microns or about 9 microns to about 11 microns). The storage medium may be a sintered, porous or foamed material. Also, the fibers may be sized to be irrespirable and may have a cross-section that has a Y-shape, cross shape, clover shape or any other suitable shape. In some example embodiments, the pre-vapor formulation reservoir 516 may include a filled tank lacking any storage medium and containing only pre-vapor formulation.

The mouth-end portion 508 includes outlets that are in fluid communication with the inner tube 514, which extends to a male anode 602, of the male connector portion 102. The male anode 602, which is discussed in more detail below, may include a through-hole 604, which is in fluid communication with the inner tube 514 on one end and in fluid communication with air inlets on an opposing end. Air inlets are discussed in more detail below.

In some example embodiments, the vaporizer assembly 4 may further include a heating element 520, a wick 522, and electrode leads 524a and 524b, which are provided to electrically couple the heating element 520 to a power supply.

Figure 6:
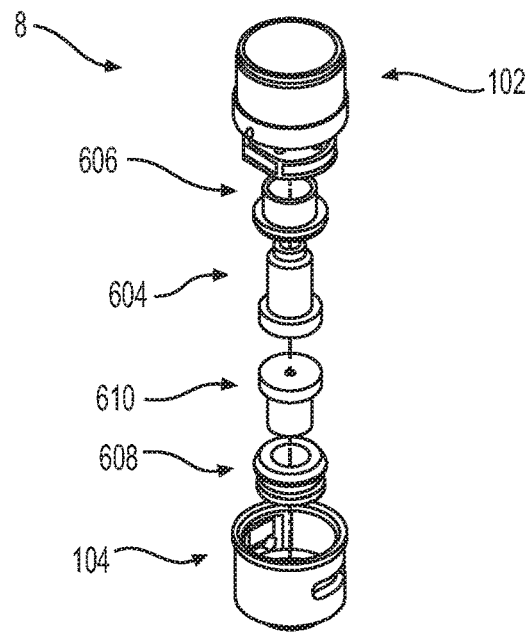
FIG. 6 illustrates an exploded view of the connector shown in FIG. 2.

FIG. 6 is an exploded view of the connector 8 illustrated without an attached vaporizer assembly or a battery assembly. The connector 8 includes the male connector 102, the male anode 602, a male insulating member 606, the female connector 104, a female insulating member 608 and a female anode 610.

With further reference to FIG. 6, the female anode 610 (e.g., battery anode) and the female insulating member 608 (e.g., gasket ring) may be disposed within the female connector 104. The female insulating member 608 may be an annular structure, with the female anode 610 extending therethrough. For instance, the female anode 610 may be arranged concentrically within the female connector 104 while being electrically isolated therefrom via the female insulating member 608.

The male anode 602 and the male insulating member 606 (e.g., gasket ring) may be disposed within the male connector 102. The male insulating member 606 may be an annular structure, with the male anode 602 extending therethrough. For instance, the male anode 602 may be arranged concentrically within the male connector 102 while being electrically isolated therefrom via the male insulating member 606. The male insulating member 606 may be formed of silicone.

Figure 7A:
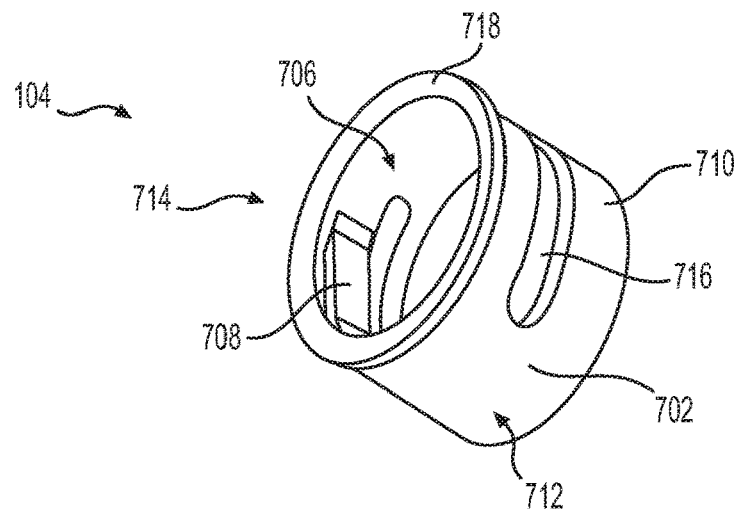
FIG. 7A illustrates a perspective view of an example embodiment of a female connector portion.
Figure 7B:
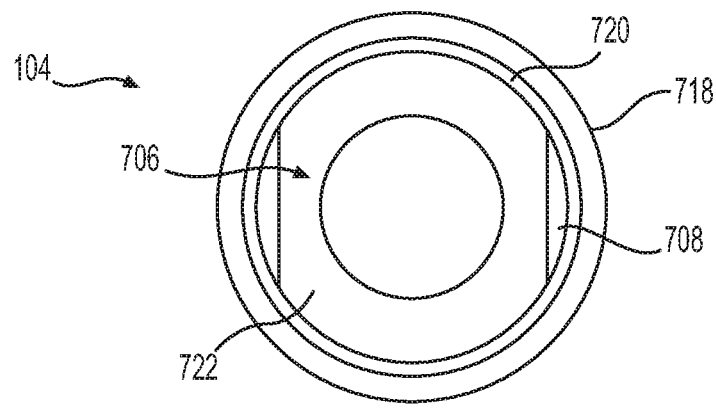
FIG. 7B illustrates a top plan view of the female connector portion shown in FIG. 7A.

Referring now to FIGS. 7A-7F, FIG. 7A is a perspective view of the female connector 104 of the battery assembly of FIG. 1A. FIG. 7B illustrates a top view of the female connector 104. The female connector 104 may include a female connector outer body 702. The female connector outer body 702 may be one part of a cathode. For example, for the battery assembly to supply power to the heater in the vaporizer assembly, electrodes 524a and 524b in the vaporizer assembly (discussed above) may be connected to the battery assembly's power supply via a cathode and an anode. As such, to complete the circuit between the heater and the power source, the female connector outer body 702, e.g., one of two parts of a cathode, connects with a corresponding cathode portion on the male connector, e.g., the second of two parts of the cathode, and the anode on the female connector, e.g., one of two parts of an anode, connects with a corresponding anode portion on the male connector, e.g., the second of two parts of the anode.

Referring to FIGS. 7A-7B, the female connector 104 may be a generally cylindrical structure. The female connector 104 may include the body 702, an internal recess 706, a secant flange 708, an external surface 408, a proximal end region 712, a distal end region 714 and at least one flange receiving slot 716.

The female connector outer body 702, may be a monolithic structure. The female connector outer body 702 may be formed of a conductive material. For instance, the female connector outer body 702 may be formed from a single piece of brass H59GB/37800 ASTM or brass coated with nickel (1-2 microns) and silver (0.08-0.20 microns). In such a non-limiting embodiment, the brass may optionally include a nickel-silver coating. In one instance, the nickel-silver coating may include a base plating of nickel (e.g., about 1-2 μm) and a top plating of silver (e.g., about 0.08-0.2 μm). The female insulating member 608 may be formed of silicone, rubber, fiberglass or any other insulating materials.

A substantially circular ridge 718 is at the distal end region 714 and is attached to an external surface 710 of the body 702. The ridge 718 has a larger external circumference than the external surface 710 of the body 702. With the exception of the flange receiving slot 716, which is described in more detail below with reference to FIGS. 7C-7F, the external surface 710 of the body 702 is substantially continuous.

The internal recess 706 may be configured to engage the male connector 102, which is described in more detail below with respect to FIGS. 8A-8E. And an example engagement between the female connector a male connector portion is described in more detail below with respect to FIGS. 9 and 10.

As shown in FIG. 7B, the internal recess 706 is defined by an internal recess surface 720 that is substantially cylindrical and may be substantially coaxial with the body 702. At least one secant flange 708 is positioned on the internal recess surface 720. The secant flange 708 may be a flange positioned at or near the distal region of the female connector 104.

As shown in FIGS. 7A-7F, the internal recess surface 720 is substantially circular. The secant flange 708 substantially forms a secant (e.g., a substantially straight line intersecting two points of the substantially circular internal recess surface 720). As such, the secant flange 708, in combination with the internal recess surface 720, forms a keyway for engagement with a correspondingly shaped section of the male connector.

For example, as shown in FIG. 7B, the cross section of the internal recess 706 at the secant flange 708 is an oval or circle that is truncated by opposing secant flanges. In some example embodiments, only a single secant flange is present. In other example embodiments, multiple secant flanges may be present. It is unnecessary that two flanges be parallel to each other. The position of each secant flange on the internal recess surface allows for the male connector with a corresponding configuration to enter the internal recess 706. Conversely, and as discussed in more detail below, with respect to FIGS. 9 and 10, the configuration of the male connector allows for the male connector to act as a key and access the internal recess 706 of the female connector 104, which may have a corresponding (e.g. reciprocal) configuration to that of the male connector's configuration.

Figure 7C:
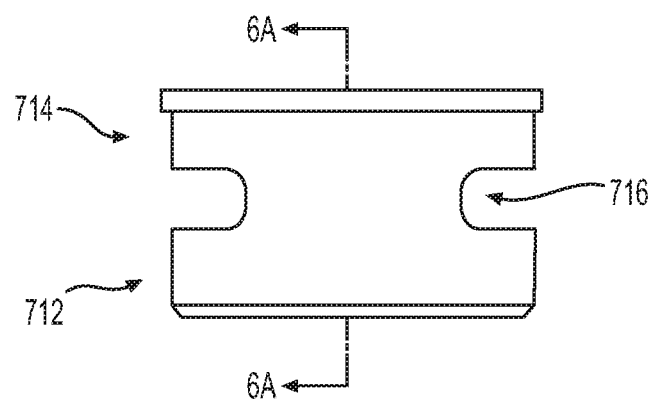
FIG. 7C illustrates a right side elevation view of the female connector shown in FIG. 7A.
Figure 7D:
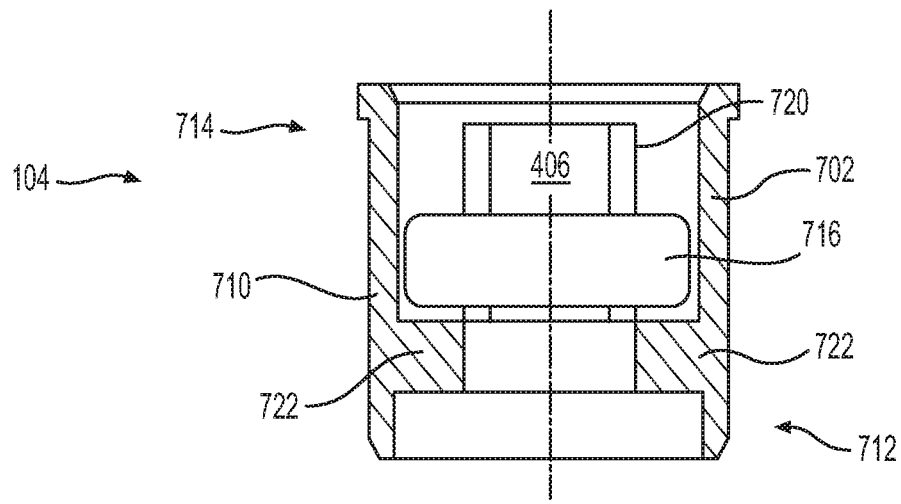
FIG. 7D illustrates a cross-sectional view of the female connector portion shown in FIG. 7A taken along line 7D-7D.
Figure 7E:
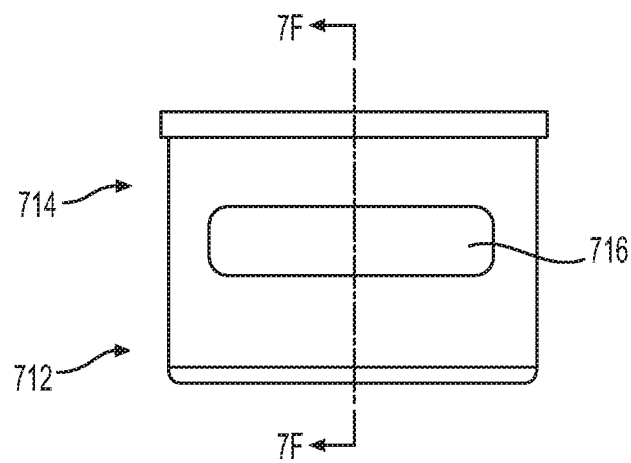
FIG. 7E illustrates a front elevation view of the embodiment shown in FIG. 7A.
Figure 7F:
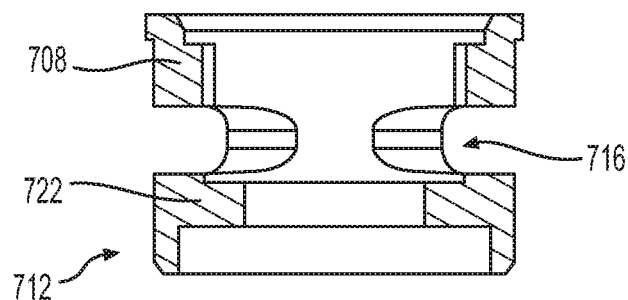
FIG. 7F illustrates a cross-sectional view of the embodiment shown in FIG. 7A take along line 7F-7F.

Referring to FIGS. 7C-7E, the flange receiving slot 716 is a through-hole providing access to the internal recess 706 from outside of the female connector 104. However, it is not necessary that the flange receiving slot 716 be a through-hole providing the access discussed above. The flange receiving slot 716 is between the proximal end region 712 and the distal end region 714 in the body 702 of the female connector 104. The flange receiving slot 716 is intended to provide a relief area for a flange of a male connector, e.g., an area in which the flange of a male connector engage when the male connector and the female connector are connected to each other. As such, the flange receiving slot 716 can be a recessed but a closed portion of the internal recess surface 720 rather than a through-hole.

With reference to FIGS. 8A-8F, the male connector 102 may have an end region 802 and an opposing end region 804. The male connector 102 may also include a body portion 808, an outer ridge 810, a neck 812, and a flange 814.

The body portion 808 may be connected to the outer ridge 810, which may be connected to the neck 812. And the neck 812 may be connected to the flange 814. The male connector 102 may be made of brass, copper or any type of metal or plastic. The neck 812 may be elongated and connect the ridge 810 to the flange 814.

In some example embodiments, the male connector 102 may be a monolithic body. In other example embodiments, some of the portions of the male connector 102 or each portion of the male connector 102 may be manufactured separately and assembled to form the entire connector. If the portions of the male connector 102 are manufactured separately and assembled, the portions of the male connector 102 may be welded together.

As discussed above, the female connector 104 may include a female anode and the male connector 102 may include a male anode to electrically couple one or more elements of the vaporizer assembly 4 to one or more power supplies in the battery assembly 6, for example, when the male and female connectors 102 and 104, respectively, are coupled together.

The male connector 102 may be formed of a conductive material. For instance, the male connector 102 may be formed from a single piece of brass. In such a non-limiting example embodiment, the brass may optionally include a nickel-silver coating. In one instance, the nickel-silver coating may include a base plating of nickel (e.g., about 1-2 μm) and a top plating of silver (e.g., about 0.08-0.2 μm). Furthermore, the male connector 102 may be a cathode, although example embodiments are not limited thereto.

The male connector 102 is configured to be seated in the housing 310 of the battery assembly 6 or the housing 502 of the vaporizer assembly 4 such that an undersurface of the outer ridge 810 contacts a distal end of the housing 310 or 410. As a result, when the vaporizer assembly 4 is connected to the battery assembly 6, for example, only the side edge of the outer ridge 810 of the male connector 102 will be visible.

The outer ridge 810 may be about midway between the proximal region 802 and the opposing end region 804 of male connector 102. The outer ridge 810 may have the largest diameter of any portion of the male connector 102.

Figure 8A:
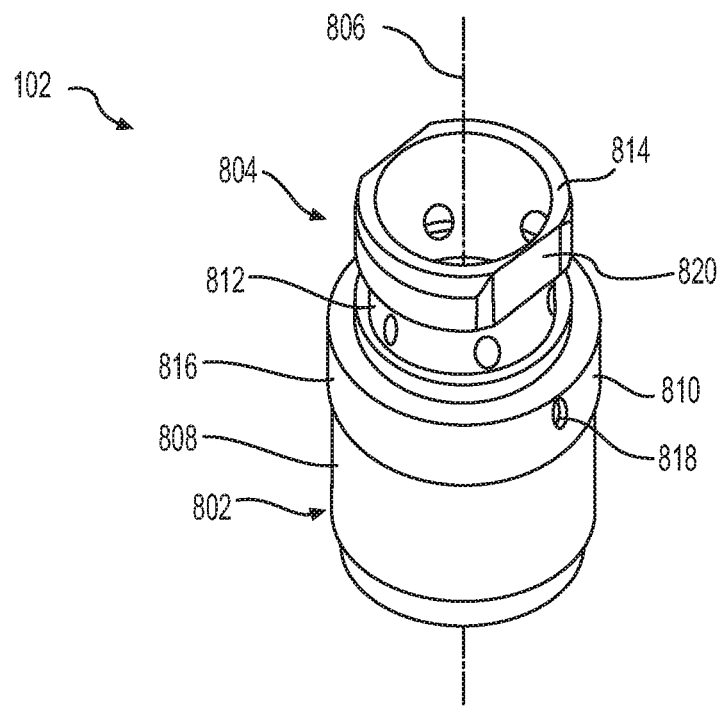
FIG. 8A illustrates a perspective view of an example embodiment of a male connector portion.
Figure 8B:
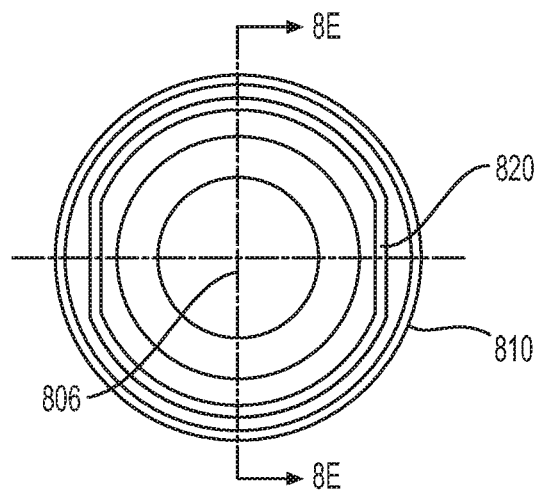
FIG. 8B illustrates a cross-sectional view of the male connector shown in FIG. 8A.
Figure 8C:
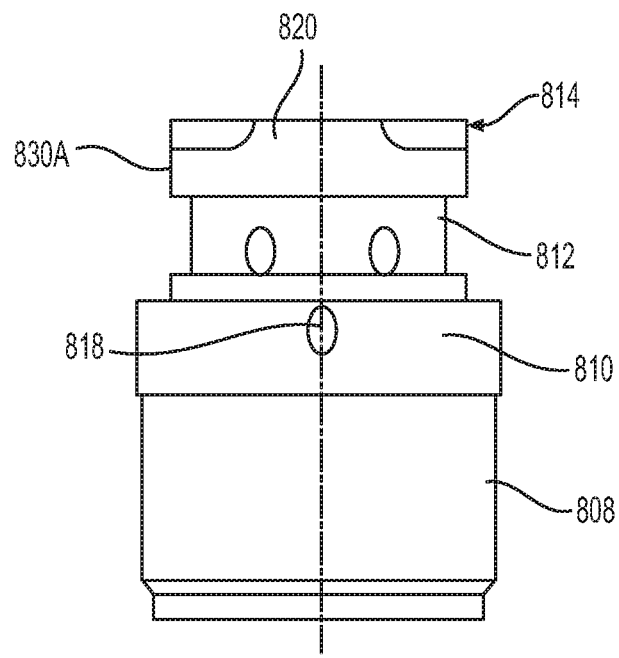
FIG. 8C illustrates a front elevation view of the male connector shown in FIG. 8A.
Figure 8D:
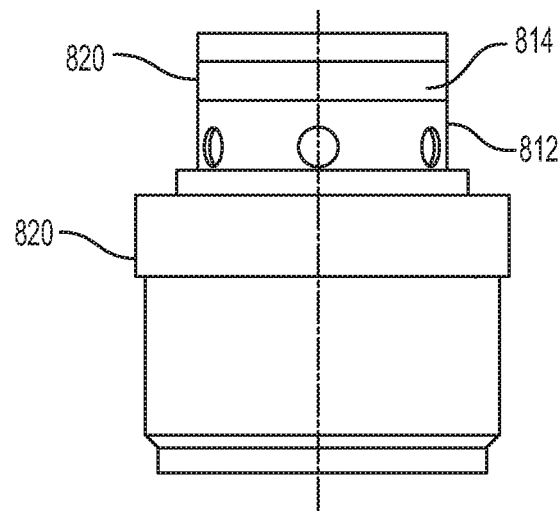
FIG. 8D illustrates a right side elevation view of the male connector shown in FIG. 8A.
Figure 8E:
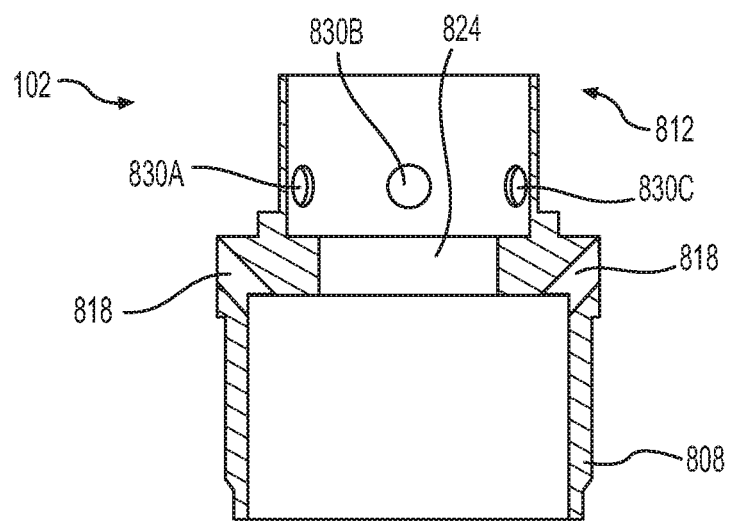
FIG. 8E illustrates a cross-sectional view of the male connector shown in FIG. 8B taken along lines 8E-8E.

With reference to FIG. 8E, an internal cylindrical surface 824 (FIG. 9) is a seat for the male anode 602, e.g., the internal cylindrical surface 824 along with the female insulating member 608 maintains the female anode 610 in position in the connector 104. The internal cylindrical surface 824 is substantially equidistant from the end region 802 and the opposing end region 804 as the outer ridge 810. The internal cylindrical surface 824 may be a continuous ring around the interior of the male connector 102.

An outer face 816 of the outer ridge 810 may be flush with an exterior surface of the housing 310 or 410. Thus, depending on the shape of the housing 310 or 410, the outer ridge 810 may be circular, rectangular, triangular, etc. In some example embodiments, the outer ridge 810 may have a cross-section that is inconsistent with the housing 310 or 410. For example, the housing 310 or 410 may have a circular cross-section while, in the same electronic vaping device, the outer ridge 810 may have a rectilinear cross-section.

The outer ridge 810 may include at least one air inlet 818. One or more additional air inlets may be included in the outer ridge 810. In the event that one or more additional air inlets are in the outlet ridge 810, the air inlets may be spaced as far apart as possible. For example, if two air inlets are present in the outer ridge 810, the air inlets may be one hundred and eighty degrees apart. Similarly, if three air inlets are present in the outer ridge 810, the air inlets may be placed one hundred and twenty degrees apart from each other. If four air inlets are present in the ridge, the inlets are ninety degrees apart from each other, etc.

The flange 814 may be on an opposing end region 804 of the male connector 102. The flange 814 may have an elliptical or substantially elliptical cross-section, which engages a recess of the female connector portion 104. Engagement of the female connector 104 with the male connector 102 is discussed in more detail below with respect to FIGS. 9 and 10. The elliptical cross-section is the result of at least one secant surface 820 being present in the flange 814. In FIG. 8, two opposing secant surfaces are shown. However, more or fewer secant surfaces are possible. The secant surfaces may be, for example, entirely planar or partially planar. The planar portion may be parallel to an axis of the male connector 102 or the female connector 104.

As shown in FIG. 8, the flange 814 is substantially circular. The secant surface 820 substantially forms a secant (e.g., a substantially straight line intersecting two points of the substantially circular flange 814). As such, the secant surface 820, in combination with the flange 814, forms a key for engagement with the correspondingly (e.g. reciprocally) shaped internal recess 706 in the female connector 104.

FIGS. 8C and 8D illustrate in more detail the male connector portion 102 shown in FIG. 8A-8B, with FIG. 8C illustrating a front view of the male connector 102 and FIG. 8D illustrating a side view of the male connector 102. As shown in FIGS. 8C and 8D, the neck 812 may be the narrowest external portion of the male connector 102. However, in some example embodiments, the external portion of the neck 812 may be as wide as the body portion 808. The neck 812 may include a plurality of pressure relief apertures 830a, 830b, and 830c. The pressure relief apertures 830a, 830b, and 830c allow air to escape the vaporizer assembly 4 when the male connector 102 is inserted in the female connector 104.

The air inlet 818 is in fluid communication with the inner tube 514 of the vaporizer assembly 4. The air inlet 818 may be tubular and have any shape cross-section, e.g., circular, square, triangular, polygonal, etc. Each of the air inlets 818 may be angled by about forty-five degrees from a central axis 806 of the vaporizer assembly 4. According to one or more example embodiments, the angle of each air inlet 818 may vary between about thirty degrees and about sixty degrees relative to the central axis 806. If a plurality of air inlets is provided in the outer edge 810, then the plurality of air inlets may all be positioned at the same angle from each other or positioned at various unequal angles. Air inlets positioned within this range, e.g., between about thirty degrees and about sixty degrees, may provide sufficient (e.g., optimum) air flow velocity and/or turbulence into the vaporizer assembly 4.

Example operation of an example embodiment of the male connector 102 and the female connector portion 104 will now be explained in more detail.

Figure 9:
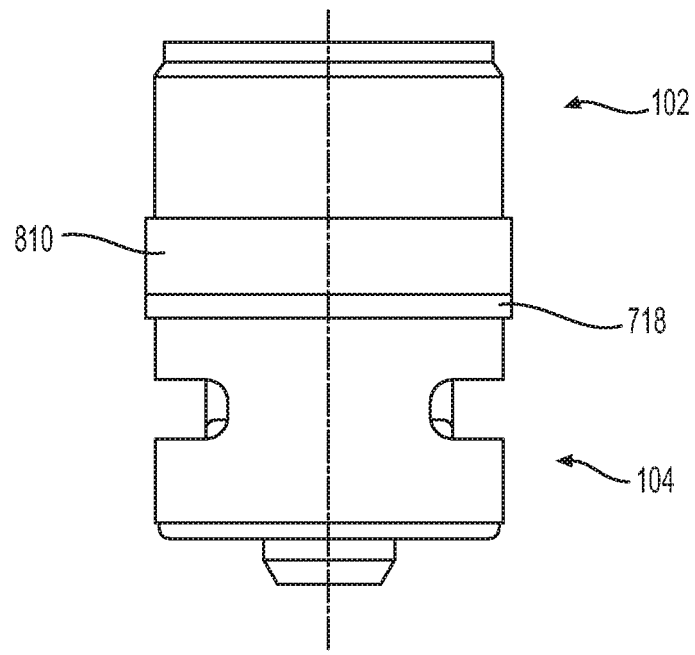
FIG. 9 illustrates an example embodiment in which a female connector is mated with a male connector.
Figure 10:
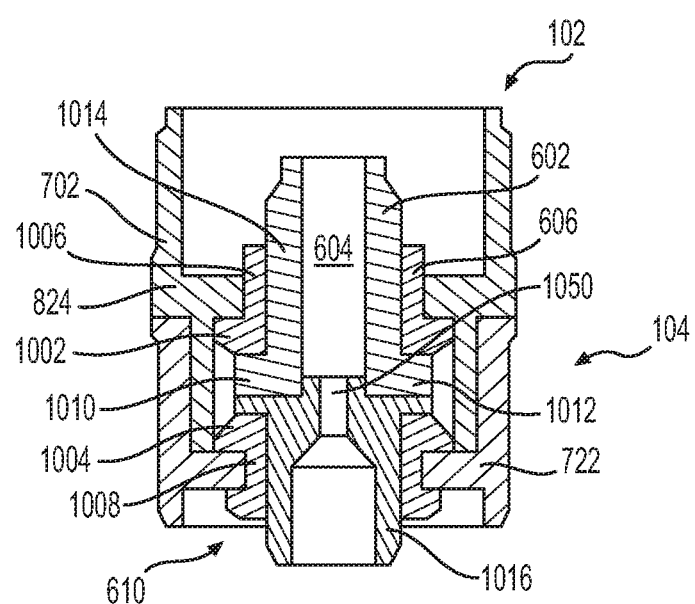
FIG. 10 illustrates a cross-sectional view of the example embodiment of FIG. 9 in which a female connector is mated with a male connector.

FIG. 9 shows the male connector 102 mated with the female connector 104. FIG. 10 shows a cross-sectional view of the male connector 102 mated with the female connector 104.

With reference to FIGS. 9 and 10, the male connector 102 engages with the female connector 104 by inserting the distal region 804 of the male connector 102 into the internal recess 706 of the female connector 104. The male connector 102 is rotated within the internal recess 706 of the female connector 104 until the flange 814 engages receiving slot 716.

Engagement between the female connector 104 and the male connector 102 results in the male connector 102 being in electrical contact with the female connector 104 and the male anode 602 being in electrical contact with the female anode 610. The male insulating member 606 electrically isolates the male connector 102 from the male anode 602, while the female insulating member 608 electrically isolates the female connector 104 from the female anode 610.

The insulating members provide opposing axial forces by each providing a force in opposition to the connection of the female connector 104 and male connector 102 with each other. The opposing forces provided by the insulating members help lock the connectors 102 and 104 together and create a seal between the connectors 102 and 104. For example, the female insulating member 608, which is between the female anode 610 and an annular ridge 722, may be made of a resilient material such as rubber, plastic, or a non-conductive metal configured as a resilient spring.

With reference to FIG. 10, the male insulating member 606 and female insulating member 608 have a male insulation member ridge 1002 and a female insulation member ridge 1004, respectively, d have a male insulation member neck 1006 and a female insulation member neck 1008, respectively. Correspondingly, the male anode 602 and the female anode 610 have a male anode ridge 1010 and female anode ridge 1012, respectively, and a male anode neck 1014 and a female anode neck 1016, respectively.

The insulation member necks 1006 and 1008 provide electrical insulation between the anode necks and the annular ridge 722 and the internal cylindrical surface 824. When the male connector 102 is mated with the female connector 104, the respective configuration of the anode ridge 1010, insulating member ridge 1002 and the internal cylindrical surface 824, for example, in the male connector, provide a resilience due to the insulating member ridge 1002 being positioned between the anode ridge 1010 and the internal cylindrical surface 824. The same configuration is present with respect to the female insulating member ridge 1004, the annular ridge 722 and the female anode ridge 1012.

As such, the female insulating member 608 causes the female anode 610 to protrude into the internal recess 706 farther than what will be its operating position. When the female anode 610 is connected to the male anode 602, the female anode 610 pushes against the female insulating member 608, which creates the opposing force in the female insulating member 608. Conversely, the male insulating member 606 is positioned between the internal cylindrical surface 824 and the male anode 602. The male insulating member 606 may be made of a resilient material such as rubber, plastic, or a non-conductive metal configured as a resilient spring. As such, when the male anode 602 is connected to the female anode 610, the male anode 602 pushes against the male insulating member 606, which creates the opposing force in the male insulating member 606. Also, when the female connector 104 and the male connector 102 are properly connected, a protrusion 1050 at a distal end region of the female anode 610 extends into the through-hole 604 of the male anode 602 to ensure a proper connection between the anodes.

Example operation of an example embodiment of an e-vaping device will be discussed below with reference to FIGS. 5A and 5B.

When negative pressure is applied to the mouth-end portion 508 of the vaporizer assembly 4, a puff sensor (not shown) is operable to sense an air pressure drop and cause the control circuitry 316 to activate the heating element 520 in accordance with a power cycle. When activated, the heating element 520 heats a portion of the wick 522 surrounded by the heating element 520 for less than about ten seconds (e.g., less than about seven seconds). Thus, the power cycle (or maximum vaping length) may range in period from about two seconds to about ten seconds (e.g., about three seconds to about nine seconds, about four seconds to about eight seconds or about five seconds to about seven seconds). However, a variety of power cycles are possible.

When negative pressure is applied to the mouth-end portion 508, air enters the electronic vaping device through the air inlet 818, and is drawn toward the mouth-end portion 508 via the inner tube 514. Thereafter, the vapor produced by the heating element 520 and the wick 522 is mixed with the air and the resultant vapor is output through the mouth-end portion 508.

Pre-vapor formulation is then transferred from the pre-vapor formulation reservoir 516 in proximity of the heating element 520 by capillary action in the wick 522. In at least one example embodiment, the wick 522 has two ends that extend into opposite sides of the pre-vapor formulation reservoir 516 to contact pre-vapor formulation contained therein. The heating element 520 at least partially surrounds a central portion of the wick 522 such that when the heating element 520 is activated, the pre-vapor formulation in the central portion of the wick 522 is vaporized by the heating element 520 to form a vapor.

Although the specific items of the connector are disclosed herein as anodes, it should be understood that these structures may be alternatively configured as cathodes. In addition, the connectors may be switched such that the male connector 102 is secured to the battery assembly 6 or 26, while the female connector 104 is secured to the vaporizer assembly 4 or 24.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electronic vaping device comprising:
   a first section having a male connector, the male connector including at least one flange on an outer surface of the male connector, at least a portion of the flange having a substantially planar first surface,
male anode portion, and
a male cathode portion; and
a second section having a female connector, the female connector configured to engage the male connector to connect the first section to the second section, the female connector defining a circular internal recess and including,
at least one secant flange on a surface of the defined internal recess, the secant flange having a semi-disk shape and including a surface extending across the defined internal recess,
a female anode portion, and
a female cathode portion.

2. The electronic vaping device as recited in claim 1, wherein, when the male connector is engaged with the female connector, the male anode portion and the female anode portion form an anode of the electronic vaping device, and the male cathode portion and the female cathode portion form a cathode of the electronic vaping device.

3. The electronic vaping device as recited in claim 1, the male connector further comprising:
a neck at an end region of the male connector; and
an aperture within the neck, the aperture configured to relieve pressure inside the female connector.

4. The electronic vaping device as recited in claim 1, wherein the male connector further comprises at least one air inlet passage offset from a centerline of the male connector by between about 30° and 60°.

5. The electronic vaping device as recited in claim 4, wherein the at least one air inlet passage is offset from a centerline of the male connector by about 45°.

6. The electronic vaping device as recited in claim 1, wherein the female anode portion defines an internal cylindrical surface.

7. The electronic vaping device as recited in claim 6, wherein the female anode portion and the female cathode portion are substantially coaxial with each other.

8. An electronic vaping device comprising:
a first section having a male connector, the male connector including
at least one flange on an outer surface of the male connector, at least a portion of the flange having a substantially planar first surface,
a male anode portion, and
a male cathode portion; and
a second section having a female connector, the female connector configured to engage the male connector to connect the first section to the second section, the female connector defining a circular internal recess and including
at least one secant flange on a surface of the defined internal recess, the secant flange having a semi-disk shape and including a surface extending across the defined internal recess,
a female anode portion, arid
female cathode portion,
wherein the female cathode portion is encompassed by the female anode portion.

9. The electronic vaping device as recited in claim 7, wherein the female anode portion is encompassed by the female cathode portion.

10. The electronic vaping device as recited in claim 6, wherein one of the female anode portion or the female cathode portion is encompassed by the internal cylindrical surface.

11. The electronic vaping device as recited in claim 1, wherein the first section is a vaporizer assembly and the second section is a battery assembly.

12. The electronic vaping device as recited in claim 1, wherein the first section is a battery assembly and the second section is a vaporizer assembly.

13. The electronic vaping device as recited in claim 1, further comprising:
a female insulating member at least partially surrounding one of the female anode or the female cathode, the female insulating member comprised of a resilient material and protruding into the defined internal recess; and
a male insulating member at least partially surrounding one of the male anode or the male cathode, the male insulating member comprised of a resilient material.

14. The electronic vaping device as recited in claim 13, wherein the female insulating member insulates the female anode from the female cathode.

15. The electronic vaping device as recited in claim 13, wherein the male insulating member insulates the male anode from the male cathode.

16. The electronic vaping device as recited in claim 1, wherein the at least one flange further includes a plurality of substantially planar secant surfaces, the secant surfaces having a plane being parallel to an axis of the male connector.

17. The electronic vaping device as recited in claim 1, wherein the female connector further includes a plurality of secant flanges.

18. The electronic vaping device of claim 17, wherein the male connector further includes a plurality of substantially planar secant surfaces, the secant surfaces having a plane being parallel to an axis of the male connector.

19. The electronic vaping device as recited in claim 18, wherein the at least one flange comprises a profile substantially corresponding with a profile of at least a portion of the defined internal recess surface.

20. The electronic vaping device as recited in claim 1, wherein the at least one flange comprises a profile substantially corresponding with a profile of at least a portion of the defined internal recess surface.

* * * * *